(12) United States Patent
Wu et al.

(10) Patent No.: US 8,467,302 B2
(45) Date of Patent: Jun. 18, 2013

(54) WIRELESS DATA TRANSMISSION METHOD, TRANSMITTING SYSTEM, AND RECEIVING SYSTEM

(75) Inventors: Yuzhong Wu, Shenzhen (CN); Jinlin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1027 days.

(21) Appl. No.: 12/104,913

(22) Filed: Apr. 17, 2008

(65) Prior Publication Data

US 2008/0212551 A1 Sep. 4, 2008

Related U.S. Application Data

(63) Continuation of application No. PCT/CN2006/002758, filed on Oct. 18, 2006.

(30) Foreign Application Priority Data

Oct. 18, 2005 (CN) .......................... 2005 1 0113966

(51) Int. Cl.
*H04J 1/16* (2006.01)
(52) U.S. Cl.
USPC ............................ 370/242; 370/282; 714/748
(58) Field of Classification Search
USPC ........... 370/235, 236, 242, 282; 714/748–750
See application file for complete search history.

(56) References Cited

U.S. PATENT DOCUMENTS

| | | | |
|---|---|---|---|
| 7,254,765 B2 | 8/2007 | Meyer et al. | |
| 2002/0075867 A1 | 6/2002 | Herrmann | |
| 2003/0007480 A1 | 1/2003 | Kim et al. | |
| 2003/0202501 A1 | 10/2003 | Jang | |
| 2004/0252664 A1 | 12/2004 | Cao et al. | |
| 2005/0152350 A1* | 7/2005 | Sung et al. | 370/376 |
| 2005/0157680 A1 | 7/2005 | Zhang et al. | |
| 2005/0232154 A1* | 10/2005 | Bang et al. | 370/235 |

(Continued)

FOREIGN PATENT DOCUMENTS

| | | |
|---|---|---|
| CN | 1411227 A | 4/2003 |
| CN | 1454017 A | 11/2003 |
| CN | 1669263 A | 9/2005 |

OTHER PUBLICATIONS

Written Opinion of the International Searching Authority in corresponding International Patent Application No. PCT/CN2006/002758 (Dec. 21, 2006).

(Continued)

*Primary Examiner* — Andrew Lee
(74) *Attorney, Agent, or Firm* — Leydig, Voit & Mayer, Ltd.

(57) ABSTRACT

A wireless data transmission method is disclosed, in which a transmitter buffers current RLC layer data. The method includes the following steps: the transmitter transmits the current RLC layer data to a receiver; receives a data-receiving packet indicating that the data is incorrectly received, the physical layer of the receiver generated and fed back by the physical layer of the receiver if a physical layer of the receiver determines that the data is incorrectly received; and transmits the buffered current RLC layer data to the receiver. A transmitting system and a receiving system are further disclosed. The method of the present disclosure may enhance the data transmission speed over the RLC layer.

17 Claims, 6 Drawing Sheets

U.S. PATENT DOCUMENTS

2006/0146831 A1* 7/2006 Argyropoulos et al. ...... 370/394
2008/0212541 A1* 9/2008 Vayanos et al. ............... 370/335
2009/0003378 A1* 1/2009 Sachs ........................... 370/466
2009/0222704 A1* 9/2009 Meyer et al. .................. 714/748
2010/0002650 A1* 1/2010 Ahluwalia .................... 370/331
2010/0251058 A1* 9/2010 Chandra et al. ............... 714/751

OTHER PUBLICATIONS

"ETSI TS 125 331—Universal Mobile Telecommunications System (UMTS); Radio Resource Control (RRC) Protocol Specification (3GPP TS 25.331 Version 6.5.0 Release 6)," 3GPP Technical Specification, Mar. 2005, V6.5.0, 3GPP, Valbonne, France.

* cited by examiner

WIRELESS DATA TRANSMISSION METHOD, TRANSMITTING SYSTEM, AND RECEIVING SYSTEM

CROSS-REFERENCE TO RELATED APPLICATIONS

This application is a continuation of International Patent Application No. PCT/CN2006/002758, filed Oct. 18, 2006, which claims priority to Chinese patent application No. 200510113966.7 submitted with the State Intellectual Property Office of P.R.C. on Oct. 18, 2005, entitled "Wireless Data Transmission Method," both the contents of which are hereby incorporated by reference in their entirety.

FIELD OF THE INVENTION

The present disclosure relates to a wireless data transmission technique, in particular, to a data transmission method, a transmitting system, and a receiving system.

BACKGROUND OF THE INVENTION

As burst error always occurs at the wireless interface, the current WCDMA system has introduced an RLC layer in the protocol layering to meet the bit error rate requirements, and such a layer is mainly used to realize functions of numbering, segmentation, cascading, and retransmission of data. Particularly, taking transmitting an uplink RLC layer data from a user equipment (UE) to a universal terrestrial radio access network (UTRAN) as an example, the RLC layer data sent from the UE-RLC layer is transmitted to an RLC layer of a radio network controller (RNC) (RNC-RLC) through a medium access control (MAC) layer of the UE (UE-MAC), a UE physical layer, and a node B (NB) physical layer of a UTRAN, and an RNC-MAC layer at the UTRAN, then, the RNC-RLC layer feeds back a data-receiving packet to the UE-RLC layer according to the current receiving state, in which the packet generally indicates whether the current data has been received correctly or not, and then the UE-RLC layer determines whether to transmit a subsequent new data or retransmit the current data according to the packet, so as to ensure the retransmission of the data that has not been received correctly to meet the bit error rate requirements.

FIG. 1 is a wireless data transmission method, in which, for example, the UE transmits an uplink RLC layer data packet X to the UTRAN. The wireless data transmission method in the prior art includes the following steps.

Steps 101-107: After receiving a high-level data packet from an upper layer of the RLC layer, a UE-RLC layer module adds RLC relevant control information into the packet and then encapsulates the packet into an RLC layer data packet X, and buffers the data packet X; then, after performing an MAC layer process on the data packet X through a UE-MAC layer module, the UE-RLC layer module transmits the data packet X to a UE physical layer module; then, the UE physical layer module performs a transmitting process on the data containing the data packet X, such as channel encoding, spreading, and modulating; then, the UE physical layer module transmits the data containing the data packet X to an NB physical layer module; then, the NB physical layer module performs a receiving process on the received data containing the data packet X, such as demodulating, despreading, and channel decoding; after performing an MAC process on the processed data through an RLC-MAC layer module, the NB physical layer module transmits the data packet X to an RNC-RLC layer module; the RNC-RLC layer module determines whether the data packet X is correctly received or not; if the data packet X is determined to be correctly received, the RNC-RLC layer module decapsulates the data packet X, extracts and then transmits the high-level packet to the upper layer of the RLC layer, and meanwhile generates an RLC layer control packet Y1 indicating that the data is correctly received, and then proceeds to Step 108 and subsequent steps; if the data packet X is determined to be incorrectly received, the RNC-RLC layer module generates an RLC layer control packet Y0 indicating that the data is incorrectly received, and then proceeds to Step 108 and the subsequent steps. In Step 107 of FIG. 1, the data is, for example, incorrectly received.

Steps 108-113: After performing the MAC layer process on the control packet Y1 or Y0 through the RNC-MAC layer module, the RNC-RLC module transmits the control packet Y1 or Y0 to the NB physical layer module; then, the NB physical layer module performs the transmitting process on the control packet Y1 or Y0, and then transmits the control packet Y1 or Y0 to the UE physical layer module; then, the UE physical layer module performs the receiving process on the control packet Y1 or Y0, and then transmits the control packet Y1 or Y0 to the UE-RLC layer module through the UE-MAC layer module; then, the UE-RLC layer module parses the control packet Y1 or Y0, to find out whether the data packet X is correctly transmitted or not. If the UE-RLC layer module receives the control packet Y1 indicating that the data is correctly received by the RNC-RLC layer module, it drops the data packet X and ends up the process. If the UE-RLC layer module receives the control packet Y0 indicating that the data is incorrectly received by the RNC-RLC layer module, it proceeds to Step 114 and subsequent steps. In Steps 108-113 of FIG. 1, the control packet Y0 is taken as an example.

Steps 114-119: The UE-RLC layer module reads the data packet X from the buffer cache and then the data packet X is performed with the MAC layer process through the UE-MAC layer module, and then transmitted to the UE physical layer module; then, the UE physical layer module performs the transmitting process on the data containing the data packet X, and then transmits the data containing the data packet X to the NB physical layer module; then, the NB physical layer module performs the receiving process on the data containing the data packet X, and then transmits the data packet X to the RNC-RLC layer module after performing the MAC layer process on the processed data through the RLC-MAC layer module; then, the RNC-RLC layer module determines whether the data packet X is correctly received or not; if the data packet X is determined to be correctly received, the RNC-RLC layer module decapsulates the data packet X, extracts and then transmits the high-level packet to the upper layer of the RLC layer, and meanwhile generates an RLC layer control packet Y1 indicating that the data is correctly received, and then proceeds to Step 120 and subsequent steps; if the data packet X is determined to be incorrectly received, the RNC-RLC layer module generates an RLC layer control packet Y0 indicating that the data is incorrectly received, and then proceeds to Step 120 and subsequent steps. In Step 119 of FIG. 1, the data is, for example, incorrectly received.

Steps 120-125: After performing the MAC layer process on the control packet Y1 or Y0 through the RNC-MAC layer module, the RNC-RLC module transmits the control packet Y1 or Y0 to the NB physical layer module; then, the NB physical layer module performs the transmitting process on the control packet Y1 or Y0, and then transmits the control packet Y1 or Y0 to the UE physical layer module; then, the UE physical layer module performs the receiving process on the control packet Y1 or Y0, and then transmits the control packet Y1 or Y0 to the UE-RLC layer module through the UE-MAC layer module; then, the UE-RLC layer module parses the control packet Y1 or Y0 to find out whether the data packet X is correctly transmitted or not. If the UE-RLC layer module receives the control packet Y1 indicating that the data is correctly received by the RNC-RLC layer module, it drops the data packet X, and ends up the process. If it receives the control packet Y0 indicating that the data is incorrectly received by the RNC-RLC layer module, it executes Steps 114-125 again, till the UE-RLC layer module receives the control packet Y1 indicating that the data is correctly received by the RNC-RLC layer module. In Steps 120-125 of FIG. 1, the control packet Y1 is taken as an example.

After receiving the control packet Y1 indicating that the data is correctly received by the RNC-RLC layer module, the UE-RLC layer module drops the buffered current data packet, so as to send a subsequent new RLC layer data.

Currently, as for the RLC layer data transmission method adopting the technique in the prior art, the transmitter determines whether to retransmit the current data or to transmit a new data, merely after the data-receiving packet fed back from the RLC layer of the receiver is received. Taking the uplink state in FIG. 1 as an example, the data-receiving packet is generated by the RNC-RLC layer and then transmitted to the UE through the NB physical layer. As the NB physical layer needs to perform corresponding processing on the data, the feed-back speed of the data-receiving packet is extremely slow, and as a result, the data transmission speed over the RLC layer is rather slow.

SUMMARY OF THE INVENTION

Accordingly, the present disclosure is directed to a wireless data transmission method, a transmitting system, and a receiving system, so as to enhance the data transmission speed over the RLC layer.

In order to achieve the above object, the present disclosure provides a wireless data transmission method, applicable for data transmission over the RLC layer between a UE and a UTRAN, in which a transmitter buffers current RLC layer data, and the method includes the following steps.

Step A: The transmitter transmits the current RLC layer data to a receiver; and if a physical layer of the receiver determines that the data is incorrectly received, the process proceeds to Step B; and Step B: The physical layer of the receiver generates and feeds back a data-receiving packet indicating that the data is incorrectly received to the transmitter, and the transmitter transmits the buffered current RLC layer data to the receiver.

Preferably, before the transmitter transmits the buffered current RLC layer data to the receiver, Step B further includes the following: the transmitter decides whether the retransmission of the current RLC layer data has reached a predetermined maximum retransmission time or not, if the retransmission of the current RLC layer data has reached a predetermined maximum retransmission time, the transmitter drops the buffered current RLC layer data or initiates a reset process; if the retransmission of the current RLC layer data has not reached a predetermined maximum retransmission time, the transmitter transmits the buffered current RLC layer data to the receiver.

Preferably, Step A further includes: if the physical layer of the receiver determines that the current data is correctly received, the process proceeds to Step C.

Step C: The physical layer of the receiver transmits the current RLC layer data to the RLC layer of the receiver through the medium access control (MAC) layer, and generates and feeds back a data-receiving packet indicating that the data is correctly received to the transmitter, and the transmitter drops the buffered current RLC layer data.

Preferably, after Step B, the method further includes: the physical layer of the receiver determines whether the data is correctly received or not, if the data is correctly received, the process proceeds to Step C; if the data is incorrectly received, the process proceeds to Step B.

In addition, an RLC layer of the transmitter may buffer the current RLC layer data.

In this case, in Step B, the physical layer of the receiver generates and feeds back a data-receiving packet indicating that the data is incorrectly received to the transmitter; the physical layer of the transmitter generates a corresponding RLC layer control packet according to the data-receiving packet, and transmits the RLC layer control packet to the RLC layer through the MAC layer; and according to the RLC layer control packet, the RLC layer of the transmitter transmits the buffered current RLC layer data to the physical layer of the receiver.

In Step C, the physical layer of the receiver transmits the current RLC layer data to the RLC layer of the receiver through the MAC layer of the receiver, and generates and feeds back a data-receiving packet indicating that the data is correctly received; the physical layer of the transmitter generates a corresponding RLC layer control packet according to the data-receiving packet, and transmits the RLC layer control packet to the RLC layer of the transmitter through the MAC layer, and then, according to the RLC layer control packet, the RLC layer of the transmitter drops the buffered current RLC layer data.

The MAC layer of the transmitter may buffer the current RLC layer data.

In this case, in Step B, the physical layer of the receiver generates and feeds back a data-receiving packet indicating that the data is incorrectly received to the physical layer of the transmitter; the physical layer of the transmitter generates a corresponding MAC layer control packet according to the data-receiving packet, and transmits the MAC layer control packet to the MAC layer of the transmitter; then, according to the MAC layer control packet, the MAC layer of the transmitter transmits the current RLC layer data to the physical layer of the receiver.

In Step C, the physical layer of the receiver transmits the current RLC layer data to the RLC layer of the receiver through the MAC layer of the receiver, generates and feeds back a data-receiving packet indicating that the data is correctly received to the physical layer of the transmitter; then, the physical layer of the transmitter generates a corresponding MAC layer control packet according to the data-receiving packet, and transmits the MAC layer control packet to the MAC layer of the transmitter; then, according to the MAC layer control packet, the MAC layer of the transmitter drops the buffered current RLC layer data.

Preferably, after receiving the RLC layer data from the physical layer of the transmitter, the physical layer of the receiver performs a receiving process on the data, and determines whether the data is correctly received or not according to a check bit in the data.

The transmitter is a UE, the RLC layer of the transmitter is a UE-RLC layer, the MAC layer of the transmitter is a UE-MAC layer, and the physical layer of the transmitter is a UE physical layer; the receiver is a UTRAN, the RLC layer of the receiver is an RLC layer of a radio network controller (RNC) (RNC-RLC), the MAC layer of the receiver is an RNC-MAC layer, and the physical layer of the receiver is a node B (NB) physical layer.

Alternatively, the transmitter is a UTRAN, the RLC layer of the transmitter is an RNC-RLC layer, the MAC layer of the transmitter is an RNC-MAC layer, and the physical layer of the transmitter is an NB physical layer; and the receiver is a UE, the RLC layer of the receiver is a UE-RLC layer, the MAC layer of the receiver is a UE-MAC layer, and the physical layer of the receiver is a UE physical layer.

The present disclosure further provides a transmitting system, which includes a data buffering module and a physical layer module.

The data buffering module is configured to buffer RLC layer data to be transmitted.

The physical layer module is configured to capture and process the RLC layer data in the data buffering module, then transmit the data to a receiver, and retransmit the RLC layer data according to a data-receiving packet received from the receiver for indicating that the RLC layer data is incorrectly received.

Preferably, the physical layer module further drops the RLC layer data in the data buffering module according to a data-receiving packet received from the receiver for indicating that the RLC layer data is correctly received.

The transmitting system further includes: an MAC layer module including the data buffering module, for receiving the RLC layer data packet; buffering the RLC layer data packet into the data buffering module; performing an MAC layer process on the RLC layer data packet; and then transmitting data containing the RLC layer data packet to the physical layer module; and re-reading the buffered corresponding RLC layer data packet according to a data-receiving packet received from the physical layer module for indicating that the data is incorrectly received; and then transmitting the RLC layer data packet to the physical layer module after performing the MAC layer process; and dropping the corresponding RLC layer data packet in the data buffering module, according to a data-receiving packet received from the physical layer module for indicating that the data is correctly received.

The physical layer module receives data containing the RLC layer data packet from the MAC layer module, transmits the data to the receiver, parses the data-receiving packet received from the receiver for indicating whether the data is correctly received or not, and then transmits a data-receiving packet, which may be identified by the MAC layer module, for indicating whether the data is correctly received or not to the MAC layer module, re-receives the data containing the RLC layer data packet from the MAC layer module, and then transmits the data to the receiver.

Alternatively, the system further includes an RLC layer module including the data buffering module and an MAC layer module.

The RLC layer module is configured to process the RLC layer data in the data buffering module, transmit the RLC layer data packet to the MAC layer, and reprocess the buffered RLC layer data and transmit the RLC layer data to the MAC layer module according to a data-receiving packet received from the MAC layer module for indicating that the data is incorrectly received; and drop the RLC layer data in the data buffering module according to a data-receiving packet received from the MAC layer module for indicating that the data is correctly received.

The MAC layer is configured to perform an MAC layer process on the received RLC data packet and then transmit data containing the RLC layer data packet to the physical layer module, and forward a data-receiving packet received from the physical layer module to the RLC layer module after performing the MAC layer process.

The physical layer module is configured to receive the data containing the RLC layer data packet from the MAC layer module and transmit the data to the receiver, and transmit a data-receiving packet indicating whether the data is correctly received or not to the MAC layer module correspondingly according to the data-receiving packet received from the receiver for indicating whether the data is correctly received or not, re-receive the data containing the RLC layer data packet from the MAC layer module, and transmit the data to the receiver.

Preferably, the physical layer module, the MAC layer module, and the RLC layer module are respectively a UE physical layer module, a UE-MAC layer module, and a UE-RLC layer module, or the physical layer module is an NB physical layer module, and the MAC layer module and the RLC layer module are respectively an RNC-MAC layer module and an RNC-RLC layer module.

The present disclosure further provides a receiving system, which includes a physical layer module, an MAC layer module, and an RLC layer module.

The physical layer module is configured to transmit a correctly received RLC layer data to an RLC layer through an MAC layer, receive an RLC layer data from a transmitter, and determine whether the RLC layer data is correctly transmitted or not, and feed back a data-receiving packet indicating that the data is incorrectly received to the transmitter according to a determination result that the RLC layer data is incorrectly received.

The RLC layer module is configured to receive the RLC layer data from the physical layer module through the MAC layer.

Preferably, the physical layer module is further configured to feed back a data-receiving packet indicating that the data is correctly received to the transmitter according to a determination result that the RLC layer data is correctly received.

The physical layer module, the MAC layer module, and the RLC layer module are respectively a UE physical layer module, a UE-MAC layer module, and a UE-RLC layer module, or the physical layer module is an NB physical layer module, and the MAC layer module and the RLC layer module are respectively an RNC-MAC layer module and an RNC-RLC layer module.

In view of the above, in the wireless data transmission method of the present disclosure, the data-receiving packet is fed back from the physical layer located at a lower layer of the RLC layer of the receiver. Taking uplink state as an example, as the data-receiving packet is generated by the NB physical layer located at the lower layer of the RNC-RLC layer and then transmitted to the UE, the transmission path of the data-receiving packet is shortened, which thus accelerates the response speed of the data-receiving packet, thereby increasing the data transmission speed over the RLC layer.

DETAILED DESCRIPTION OF THE EMBODIMENTS

In order to make objects, technical solutions, and advantages of the present disclosure more comprehensible, the present disclosure is further described below in detail with reference to the accompanying drawings.

The technical solution of an embodiment of the present disclosure is feeding back a control packet for determining whether the data is correctly received or not through a physical layer of a receiver, so as to enhance the speed for feeding back the data-receiving packet about whether the RLC layer data is correctly received or not, and thus increase the data transmission speed over the RLC layer.

Figure 1:
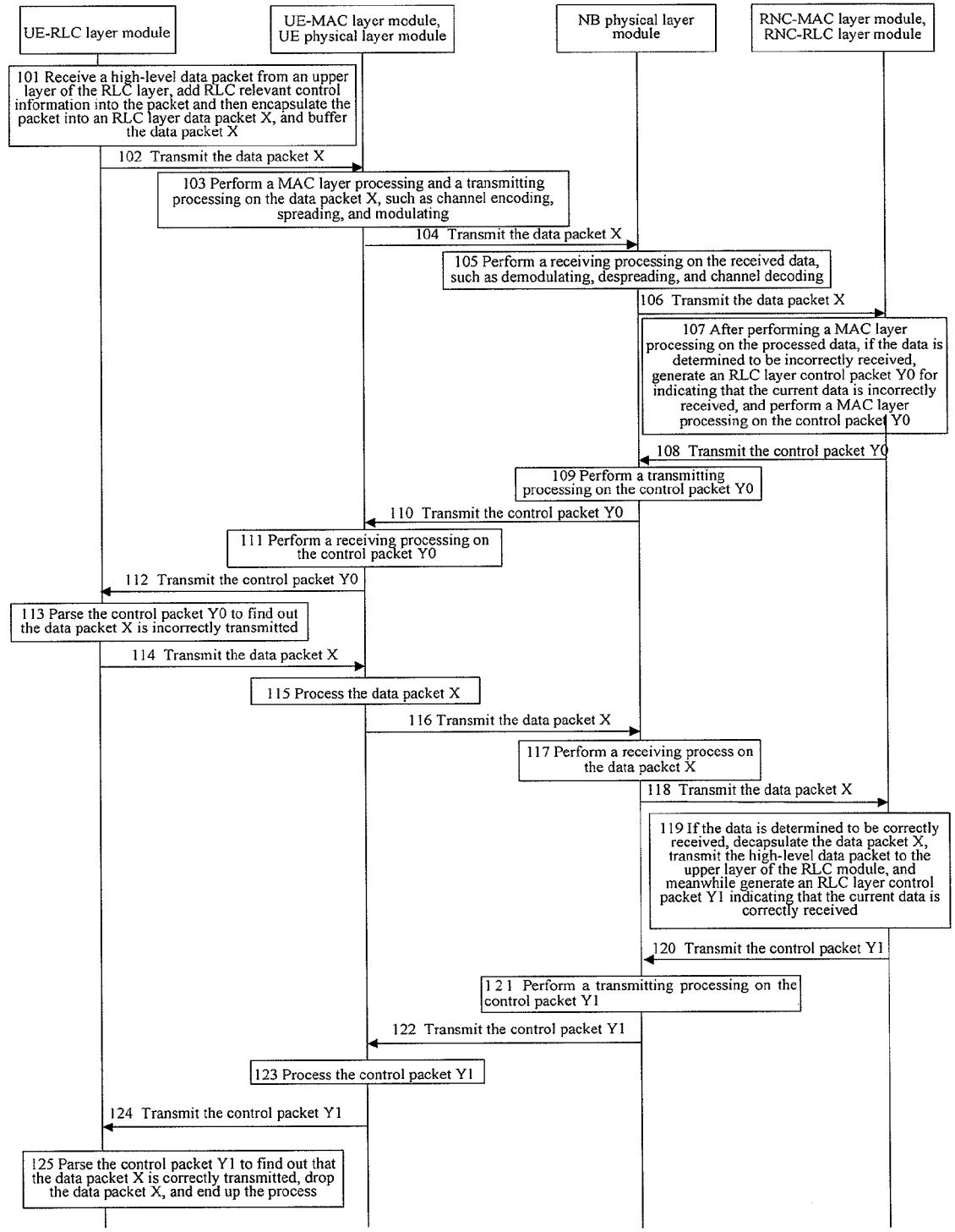
FIG. 1 is a wireless data transmission method.
Figure 2:
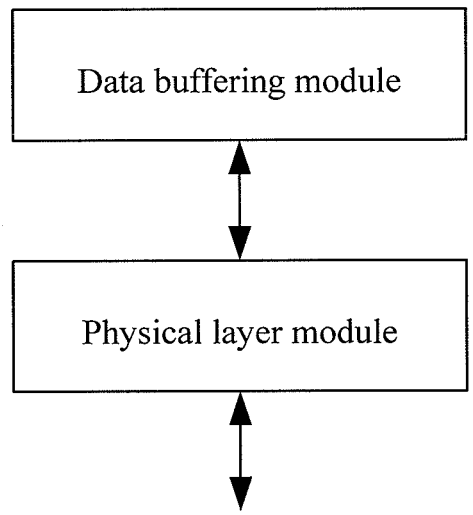
FIG. 2 is a schematic structural view of a transmitter according to an embodiment of the present disclosure.

In an embodiment of the present disclosure, the structure of the transmitter is shown in FIG. 2. Referring to FIG. 2, the transmitter includes a physical layer module and a data buffering module.

The data buffering module is configured to buffer an RLC layer data to be transmitted.

The physical layer module is configured to capture and process the RLC layer data in the data buffering module, then transmit the data to a receiver, and retransmit the data containing the RLC layer data according to a data-receiving packet received from the receiver for indicating that the RLC layer data is incorrectly received.

The physical layer module may further be configured to drop the data in the data buffering module according to a data-receiving packet received from the receiver for indicating that the RLC layer data is correctly received.

Figure 3:
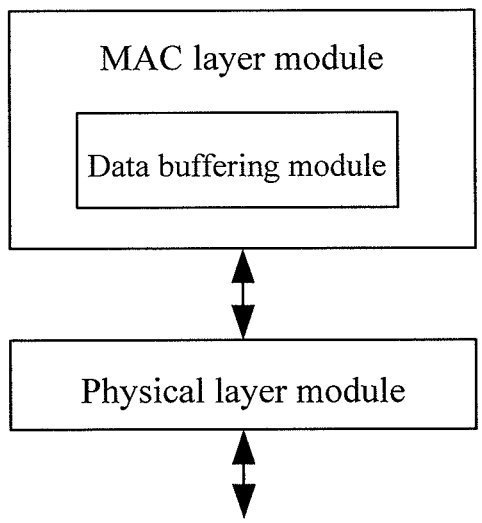
FIG. 3 is a schematic structural view of a data buffering module of the transmitter disposed in a physical layer module according to an embodiment of the present disclosure.
Figure 4:
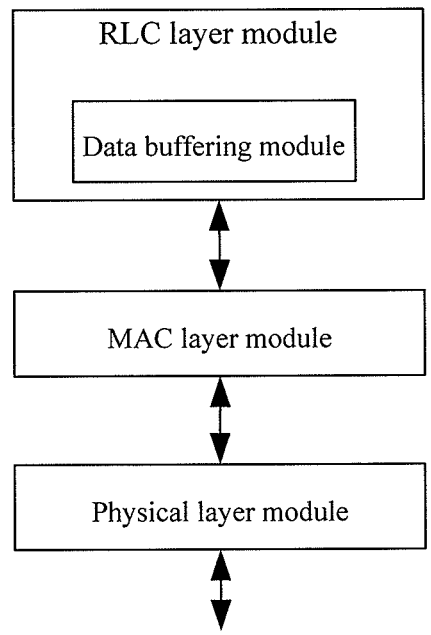
FIG. 4 is a schematic structural view of the data buffering module of the transmitter disposed in an RLC layer module according to an embodiment of the present disclosure.

The data buffering module may be disposed separately, or may also be disposed in an MAC layer module, as shown in FIG. 3, or may be disposed in an RLC layer module, as shown in FIG. 4.

Referring to FIG. 3, the MAC layer module receives an RLC layer data packet from the RLC layer module, and buffers the RLC layer data packet into the data buffering module, performs an MAC layer process on the RLC layer data packet, then transmits data containing the RLC layer data packet to the physical layer module, and re-reads the buffered corresponding RLC layer data packet according to a data-receiving packet received from the physical layer module for indicating that the data is incorrectly received, and transmits the data to the physical layer module after performing the MAC layer process; and drops the corresponding RLC layer data packet in the data buffering module according to a data-receiving packet received from the physical layer module for indicating that the data is correctly received.

When the physical layer module captures the data, it receives the data containing the RLC layer data packet from the MAC layer module, and then transmits the data to the receiver. Furthermore, the physical layer module is configured to parse the received data-receiving packet for indicating whether the data is correctly received or not, transmit a data-receiving packet for indicating whether the data is correctly received or not capable of being identified by the MAC layer module, i.e., an MAC layer control packet, to the MAC layer module, re-receive the data containing the RLC layer data packet from the MAC layer module, and transmit the data to the receiver.

Referring to FIG. 4, the RLC layer module is configured to process the RLC layer data in the data buffering module and transmit the RLC layer data packet to the MAC layer module, and re-process the buffered RLC layer data and then transmit the data to the MAC layer module according to a data-receiving packet received from the MAC layer module for indicating that the data is incorrectly received; and drop the RLC layer data in the data buffering module according to a data-receiving packet received from the MAC layer module for indicating that the data is correctly received.

The MAC layer is configured to perform an MAC layer process on the received RLC data packet and then transmit data containing the RLC layer data packet to the physical layer module, and forward a data-receiving message received from the physical layer module to the RLC layer module after performing the MAC layer process.

The physical layer module is configured to receive the data containing the RLC layer data packet from the MAC layer module and transmit the data to the receiver, and transmit a data-receiving packet indicating whether the data is correctly received or not capable of being identified by the RLC layer module to the RLC layer module through the MAC layer module correspondingly according to the received data-receiving packet for indicating whether the data is correctly received or not, i.e., an RLC layer control packet, and re-receive the data containing the RLC layer data packet from the MAC layer module and transmits the data to the receiver.

In FIG. 3 or 4, a maximum retransmission time is pre-set in the MAC layer module or the RLC layer module including the data buffering module. Upon receiving the data-receiving packet indicting that the data is incorrectly received, the MAC layer module or the RLC layer module determines whether the maximum retransmission time has been reached or not, and if the maximum retransmission time has not been reached, the MAC layer module or the RLC layer module retransmits the RLC layer data in the data buffering module, and if the maximum retransmission time has been reached, the MAC layer module or the RLC layer drops the buffered data. In addition, once the RLC layer module determines that the maximum retransmission time has been reached, it can also initiate a reset process. The reset process includes: The RLC layer module transmits a RESET message to the RLC layer module of the receiver, and after receiving the RESET message, the RLC layer module of the receiver feeds back a RESET_ACK to the transmitting, thereby completing the reset process. Furthermore, once the reset time has reached a certain number, the current RLC layer retransmitting mechanism may initiate a service release process.

The transmitter may be a UE, and the receiver is a universal terrestrial radio access network (UTRAN). The physical layer module, the MAC layer module, and the RLC layer module are respectively a UE physical layer module, a UE-MAC layer module, and a UE-RLC layer module.

The transmitter may also be a UTRAN, and the receiver is a UE. The physical layer module is an NB physical layer module, the MAC layer module is an RNC-MAC layer module, and the RLC layer module is an RNC-RLC layer module. It is known to those of ordinary skill in the art that, during practical implementation, when the NB physical layer module transmits data to the RNC-MAC layer module, the data is transmitted through the RNC physical layer.

Figure 5:
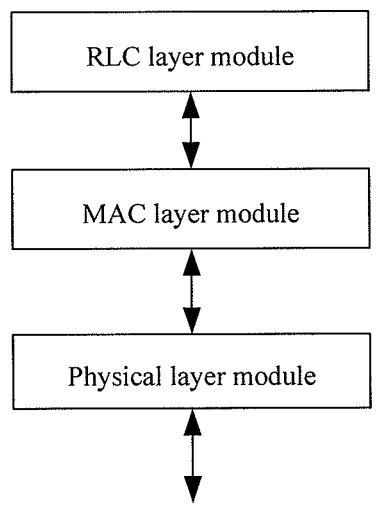
FIG. 5 is a schematic structural view of a receiver according to an embodiment of the present disclosure.

Corresponding to the transmitter, the structure of the receiver in an embodiment of the present disclosure is shown in FIG. 5, which includes a physical layer module, an MAC layer module, and an RLC layer module.

The physical layer module is configured to transmit a correctly received RLC layer data to the RLC layer module through the MAC layer module, receive an RLC layer data from the transmitter, and feed back a data-receiving packet indicating that the data is incorrectly received to the transmitter according to a determination result that the data is incorrectly received.

The process that the physical layer module transmits a correctly received RLC layer data to the RLC layer module through the MAC layer module includes the following steps. The physical layer module receives the data containing the RLC layer data packet from the transmitter, performs a receiving process on the data to determine whether the data is correctly received or not, and then, after determining that the data is correctly received, transmits the data containing the RLC layer data packet to the MAC layer module. After performing an MAC layer process on the received data, the MAC layer module transmits the RLC layer data packet to the RLC layer module.

The RLC layer module is configured to receive and process the RLC layer data packet from the MAC layer.

The physical layer module is further configured to feed back a data-receiving packet indicating that the data is correctly received to the transmitter according to a determination result that the RLC layer data is correctly received.

After performing the receiving process on the data, such as demodulating, despreading, and channel decoding, the physical layer module determines whether the data is correctly received or not according to a check bit in the data.

Referring to FIG. 5, the receiver may be a UE, and the corresponding transmitter is a UTRAN. The physical layer module, the MAC layer module, and the RLC layer module are respectively a UE physical layer module, a UE-MAC layer module, and a UE-RLC layer module.

Referring to FIG. 5, the receiver may be a UTRAN, and the corresponding transmitter is a UE. The physical layer module is an NB physical layer module, the MAC layer module is an RNC-MAC layer module, and the RLC layer module is an RNC-RLC layer module. It is well known to those of ordinary skill in the art that the RNC physical layer module is needed when the NB physical layer module transmits data to the RNC-MAC layer.

Figure 6:
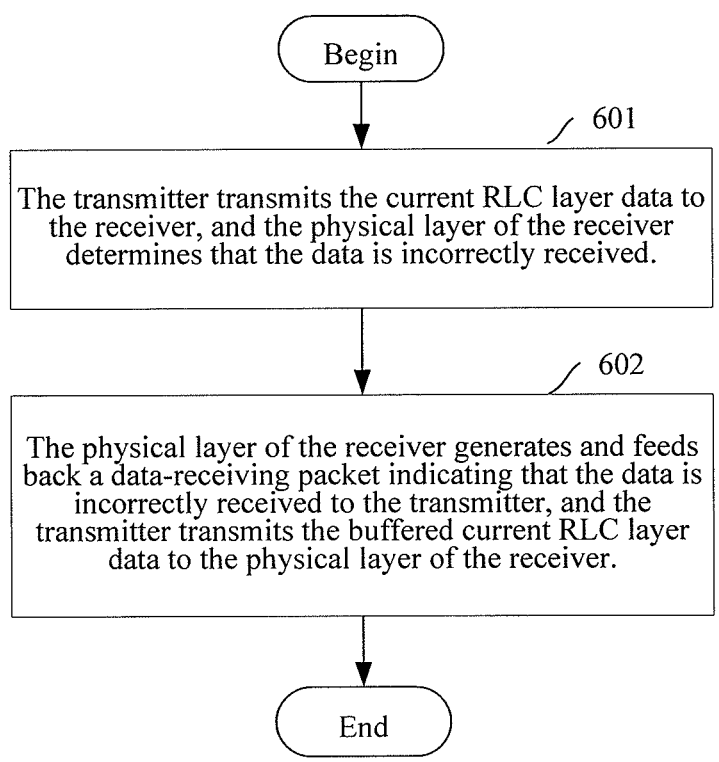
FIG. 6 is an overall flow chart of a wireless data transmission method according to an embodiment of the present disclosure.

The present disclosure further provides a wireless data transmission method, applicable for data transmission over an RLC layer between a UE and a UTRAN, in which a transmitter buffers current RLC layer data. The overall flow chart of the method is shown in FIG. 6, which includes the following steps:

In Step 601, the transmitter transmits the current RLC layer data to a receiver, and when a physical layer of the receiver determines that the data is incorrectly received, it proceeds to Step 602; and In Step 602, the physical layer of the receiver generates and feeds back a data-receiving packet indicating that the data is incorrectly received to the transmitter, and the transmitter transmits the buffered current RLC layer data to the physical layer of the receiver.

In Step 601, when determining the current data is correctly received, the physical layer of the receiver transmits the current RLC layer data to an RLC layer of the receiver through an MAC layer, and generates and feeds back a data-receiving packet indicating that the data is correctly received to the transmitter, and the transmitter drops the current RLC layer data.

After Step 602, the physical layer of the receiver may still decide whether the current data is correctly received or not, and if the current data is determined to be correctly received, the physical layer of the receiver transmits the current RLC layer data to the RLC layer of the receiver, and generates and feeds back the data-receiving packet indicating that the data is correctly received to the transmitter, and the transmitter drops the current RLC layer data; if the current data is determined to be incorrectly received, the physical layer of the receiver generates and feeds back the data-receiving packet indicating that the data is incorrectly received to the transmitter, and the transmitter transmits the buffered current RLC layer data to the physical layer of the receiver, so as to ensure the correct data transmission.

As the infinite data retransmission will cause severe wastes of communication resources, a maximum retransmission time is set at the transmitter. Upon receiving the data-receiving packet indicating that the data is incorrectly received, the transmitter determines whether the maximum retransmission time has been reached or not, if the maximum retransmission time has been reached, it directly drops the buffered corresponding RLC layer data, or performs a reset process; otherwise, it retransmits the buffered RLC layer data.

In the method of the present disclosure, the transmitter buffers the current RLC layer data in the MAC layer thereof or in the RLC layer thereof.

When the transmitter buffers the current RLC layer data in the RLC layer, the receiver feeds back the data-receiving packet to the physical layer of the transmitter, and the physical layer of the transmitter parses the packet, and transmits a data-receiving packet capable of being identified by the RLC layer to the RLC layer of the transmitter correspondingly, and according to the data-receiving packet, the RLC layer of the transmitter retransmits the buffered current RLC layer data or drops the buffered RLC layer data, or performs a reset process. Herein, the data-receiving packet capable of being identified by the RLC layer is an RLC layer control packet.

When the transmitter buffers the current RLC layer data in the MAC layer, the receiver feeds back the data-receiving packet to the physical layer of the transmitter, and the physical layer of the transmitter parses the packet and then transmits a data-receiving packet indicating whether the data is correctly received or not capable of being identified by the MAC layer to the MAC layer. The MAC layer reads the current RLC layer data buffered therein according to the packet, performs an MAC layer process, and then transmits the data to the physical layer of the receiver through the physical layer of the transmitter, or drops the buffered current RLC layer data. Herein, the data-receiving packet capable of being identified by the MAC layer is an MAC layer control packet.

In order to make the objects, technical solutions, and advantages of the present disclosure more comprehensible, the present disclosure is further described below in detail through the following embodiments with reference to the accompanying drawings.

Embodiment 1

In this embodiment, the MAC layer module of the transmitter buffers the current RLC layer data, the MAC layer module of the transmitter determines whether to retransmit the current data or not according to the data-receiving packet fed back from the physical layer module of the receiver.

Figure 7:
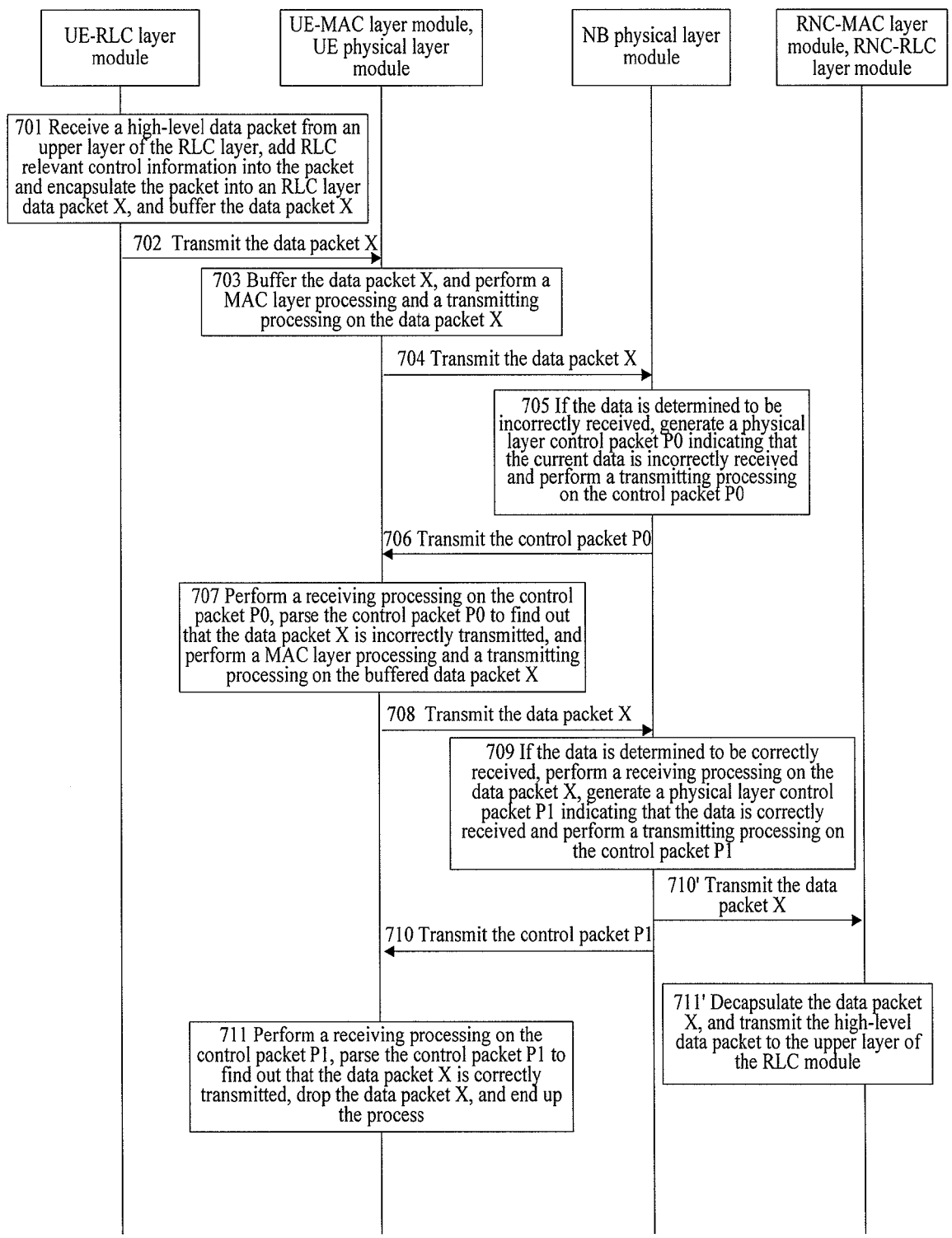
FIG. 7 is a wireless data transmission method according to an embodiment of the present disclosure.

FIG. 7 is a flow chart of a data transmission method according to an embodiment of the present disclosure. For example, the UE transmits an uplink RLC layer data packet X to the UTRAN, which specifically includes the following steps.

Steps 701-705: After receiving a high-level data packet from an upper layer of the RLC layer, a UE-RLC layer module adds RLC relevant control information into the packet and encapsulates the packet into an RLC layer data packet X, and then transmits the data packet X to an MAC layer module. The MAC layer module buffers the received data packet, performs an MAC layer process on the packet and then transmits the packet to a UE physical layer module. The UE physical layer module performs a transmitting process on the data packet, and then transmits the data containing the processed data packet X to an NB physical layer module. The NB physical layer module determines whether the data is correctly received or not. If the data is correctly received, the NB physical layer module generates a physical layer control packet P1 indicating that the data is correctly received and then performs a transmitting process on the physical layer control packet P1, and then proceeds to Step 706 and the subsequent steps. Meanwhile, after performing a receiving process on the data packet X, the RNC-MAC layer performs an MAC layer process on the data packet X, and then transmits the data packet X to the RNC-RLC layer module. The RNC-RLC layer module decapsulates the data packet X and then transmits the high-level data packet to the upper layer of the RLC layer module. If the data is incorrectly received, the NB physical layer module generates a physical layer control packet P0 indicating that the data is incorrectly received and performs a transmitting process on the physical layer control packet P0, and then proceeds to Step 706 and the subsequent steps. In Step 705 of FIG. 7, the data is, for example, incorrectly received.

Steps 706-707: The NB physical layer module transmits the control packet P1 or P0 to the UE physical layer module. The UE physical layer module performs a receiving process on the control packet P1 or P0. If the control packet P1 is received, the UE physical layer module parses the control packet P1 to find out the data packet X is correctly transmitted and then transmits an MAC layer control packet indicating that the data is correctly received to the UE-MAC layer module. After receiving the MAC layer control packet indicating that the data is correctly received, the UE-MAC layer module drops the buffered data packet X, and ends up the process. If the control packet P0 is received, the UE physical layer module parses the control packet P0 to find out that the data packet X is incorrectly transmitted, and then transmits an MAC layer control packet indicating that the data is incorrectly received to the UE-MAC layer module. After receiving the MAC layer control packet indicating that the data is incorrectly received, the UE-MAC layer module determines whether the maximum retransmission time has been reached or not, if the maximum retransmission time has been reached, the UE-MAC layer module drops the buffered data packet X, and ends up the process; and if the maximum retransmission time has not been reached, the UE-MAC layer module performs the MAC layer process on the buffered data packet X once again, and transmits the data packet X to the UE physical layer module for a transmitting process, and then proceeds to Step 708 and the subsequent steps. In Steps 706-707 of FIG. 7, the control packet P0 is taken as an example.

Steps 708-709: The UE physical layer transmits the data packet X to the NB physical layer module. The NB physical layer module determines whether the data is correctly received or not. If the data is determined to be correctly received, the NB physical layer module generates the control packet P1 indicating that the data is correctly received and performs a transmitting process on the data, and then executes Step 710 and the subsequent steps, and meanwhile executes Step 710' and the subsequent steps. If the data is determined to be incorrectly received, the NB physical layer module generates the control packet P0 indicating that the data is incorrectly received and performs a transmitting process on the data, and then executes Step 710 and the subsequent steps. In Step 709 of FIG. 7, the data is, for example, correctly received.

Steps 710-711: The NB physical layer module transmits the control packet P1 or P0 to the UE physical layer module. The UE physical layer module performs a receiving process on the control packet P1 or P0. If the control packet P1 is received, the UE physical layer module parses the control packet P1 to find out that the data packet X is correctly transmitted and then transmits an MAC layer control packet indicating that the data is correctly received to the UE-MAC layer module. After receiving the MAC layer control packet indicating that the data is correctly received, the UE-MAC layer module drops the buffered data packet X, and ends up the process. If the control packet P0 is received, the UE physical layer module parses the control packet P0 to find out the data packet X is incorrectly transmitted, and then transmits an MAC layer control packet indicating that the data is incorrectly received to the UE-MAC layer module. After receiving the MAC layer control packet indicating that the data is incorrectly received, the UE-MAC layer module performs the MAC layer process on the buffered data packet X once again, and transmits the data to the UE physical layer module for a transmitting process, and executes Steps 708-711, till the UE-MAC layer module receives a control packet P1 indicating that the data is correctly received by the NB physical layer module, or till the maximum retransmission time is reached. In Steps 710-711 of FIG. 7, the control packet P1 is taken as an example.

Steps 710'-711': The NB physical layer module transmits the data packet X to the RNC-RLC layer module through the RNC physical layer module and the MAC layer module. The RNC-RLC layer module decapsulates the data packet X and transmits the high-level data packet to the upper layer of the RLC layer module.

The forms of the physical layer control packets P1 and P0 are not particularly limited, and as data-receiving packets, each of them may be one-bit digit under the simplest condition. Furthermore, in Steps 705 and 709, after performing a receiving process on the data, such as demodulating, despreading, and channel decoding, the NB physical layer module can determine whether the data is correctly received or not according to a check bit in the data.

Embodiment 2

In this embodiment, the RLC layer module of the transmitter buffers the current RLC layer data, and determines whether to retransmit the current data or not according to a data-receiving packet fed back by the physical layer module of the receiver.

Figure 8:
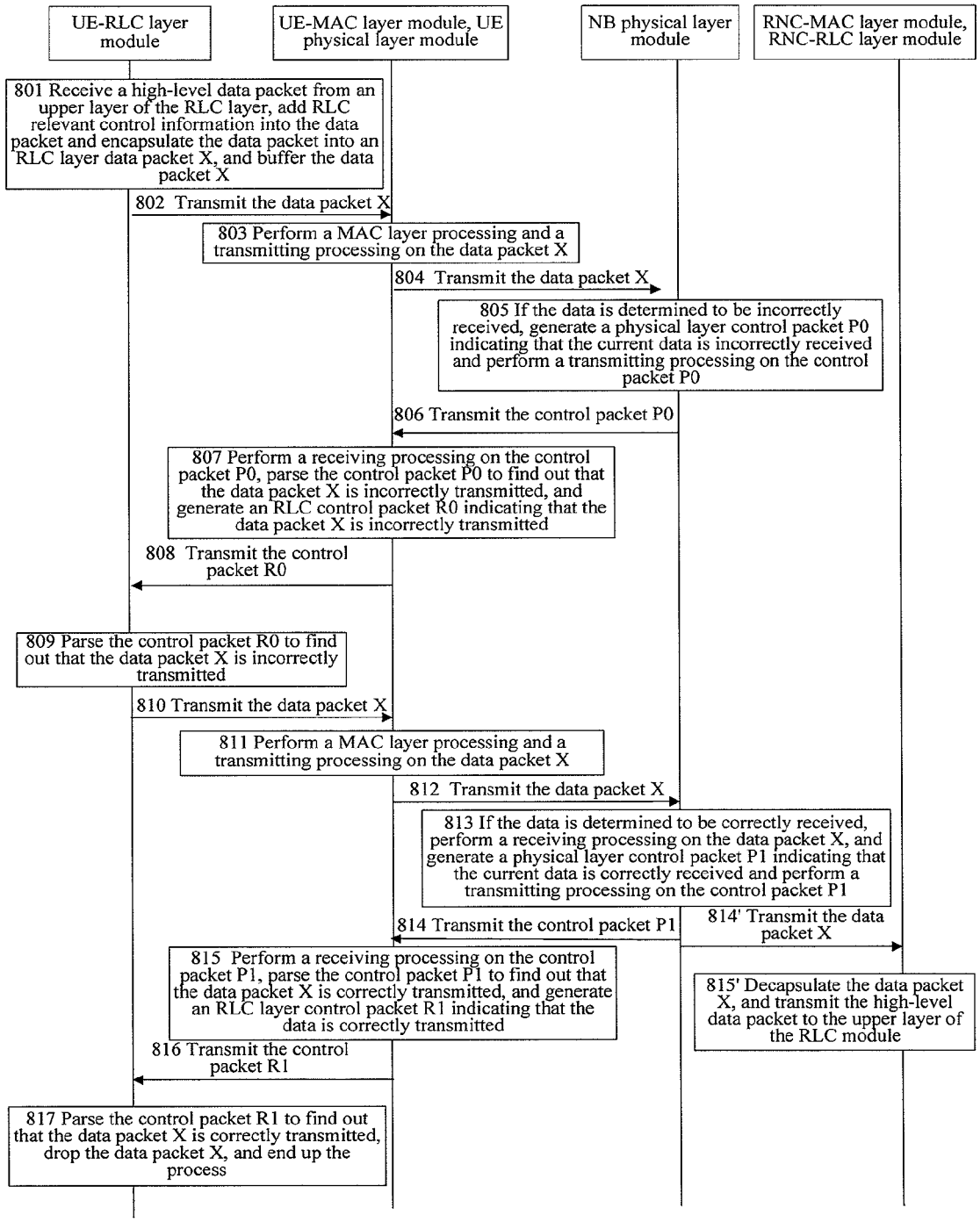
FIG. 8 is a wireless data transmission method according to another embodiment of the present disclosure.

FIG. 8 is a flow chart of a data transmission method according to another embodiment of the present disclosure. For example, the UE transmits an uplink RLC layer data packet X to the UTRAN, which includes the following steps.

Steps 801-805: After receiving a high-level data packet from an upper layer of the RLC layer, a UE-RLC layer module adds RLC relevant control information into the data packet and encapsulates the data packet into an RLC layer data packet X, and buffers the data packet X, and then transmits the data packet X to a UE-MAC layer module. The UE-MAC layer module performs an MAC layer process on the data packet and then transmits the data containing the data packet X to a UE physical layer module. The UE physical layer module performs a transmitting process on the received data containing the data packet X, and then transmits the data containing the data packet X to the NB physical layer module. The NB physical layer module determines whether the data is correctly received or not. If the data is correctly received, the NB physical layer module generates a physical layer control packet P1 indicating that the data is correctly received and performs a transmitting process on the data, and then executes Step 806 and the subsequent steps, and meanwhile, after a receiving process, the data packet X is transmitted to an RNC-RLC layer module through the physical layer module and the RNC-MAC layer module, and then the RNC-RLC layer module decapsulates the data packet X and transmits the high-level data packet to the upper layer of the RLC layer. If the data is incorrectly received, the NB physical layer module generates a physical layer control packet P0 indicating that the data is incorrectly received and performs a transmitting process, and then executes Step 806 and the subsequent steps. In Step 805 of FIG. 8, the data is, for example, incorrectly received.

Steps 806-809: The NB physical layer module transmits the control packet P1 or P0 to the UE physical layer module. The UE physical layer module performs a receiving process on the control packet P1 or P0, and finds out whether the data packet X is correctly transmitted or not according to the parsing result of the control packet P1 or P0, and generates a corresponding control packet R1 or R0 for indicating whether the data packet X is correctly transmitted or not, in which the control packet R1 or R0 is capable of being identified by the UE-RLC layer module. Then, the UE-MAC layer module performs an MAC layer process on the control packet R1 or R0 and then transmits the control packet R1 or R0 to the UE-RLC layer module. The UE-RLC layer module parses the control packet R1 or R0 to find out whether the data packet X is correctly transmitted or not. If the control packet R1 is received, the UE-RLC layer module drops the data packet X, and ends up the process. If the control packet R0 is received, the UE-RLC layer module executes Step 810 and the subsequent steps. In Step 806 of FIG. 8, the control packet P0 is taken as an example. Accordingly, in Steps 807-809 of FIG. 8, the control packet R0 is taken as an example.

Steps 810-813: The UE-RLC layer module determines whether the retransmission of the data packet X has reached the maximum retransmission time or not, if the retransmission of the data packet X has reached the maximum retransmission time, the UE-RLC layer module directly drops the data packet X or initiates a reset process; if the retransmission of the data packet X has not reached the maximum retransmission time, the UE-RLC layer module transmits the buffered data packet X to the UE-MAC layer module. Then, the UE-MAC layer module performs an MAC layer process on the data packet X, and then transmits the data containing the data packet X to the UE physical layer module. The UE physical layer module performs a transmitting process on the received data containing the data packet X, and then transmits the data containing the data packet X to the NB physical layer module. The NB physical layer module determines whether the data is correctly received or not. If the data is correctly received, the NB physical layer module generates a physical layer control packet P1 for indicating that the data is correctly received and performs a transmitting process, and executes Step 814 and the subsequent steps, and simultaneously, executes Steps 814' and 815'. If the data is incorrectly received, the NB physical layer module generates a physical layer control packet P0 for indicating that the data is incorrectly received and performs a transmitting process, and executes Step 814 and the subsequent steps. In Step 813 of FIG. 8, the data is, for example, correctly received.

Steps 814-817: The NB physical layer module transmits the control packet P1 or P0 to the UE physical layer module. The UE physical layer module performs a receiving process on the control packet P1 or P0, and finds out whether the data packet X is correctly received or not according to the parsing result of the control packet P1 or P0, and generates a corresponding control packet R1 or R0 for indicating whether the data packet X is correctly transmitted or not, in which the control packet R1 or R0 is capable of being identified by the UE-RLC layer module. Then, the UE-MAC layer module performs an MAC layer process on the control packet R1 or R0 and transmitted the control packet R1 or R0 to the UE-RLC layer module. The UE-RLC layer module parses the control packet R1 or R0 to find out whether the data packet X is correctly transmitted or not. If the control packet R1 is received, the UE-RLC layer module drops the buffered data packet X, and ends up the process. If the control packet R0 is received, the UE-RLC layer module executes Steps 810-817 once again. In Step 814 of FIG. 8, the control packet P1 is taken as an example. Accordingly, in Steps 815-817 of FIG. 8, the control packet R1 is taken as an example.

Steps 814'-815': The NB physical layer module transmits the data packet X to the RNC-RLC layer module through the RNC physical layer module and the RNC-MAC layer module. The RNC-RLC layer module decapsulates the data packet X and transmits the high-level data packet to the upper layer of the RLC layer module.

The forms of the physical layer control packets P1 and P0 and the control packets R1 and R0 transmitted from the physical layer to the RLC layer are not particularly limited, and as data-receiving packets, each of them may be one-bit digit under the simplest condition. Furthermore, in Steps 805 and 813, after performing a receiving process on the data, such as demodulating, despreading, and channel decoding, the NB physical layer module may determine whether the data is correctly received or not according to the check bit in the data.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A wireless data transmission method, wherein a transmitter buffers current RLC layer data, the method comprising:
    transmitting, by the transmitter, the current RLC layer data to a receiver;
    receiving, by the transmitter, a data-receiving packet indicating that the data is incorrectly received generated and fed back by the physical layer of the receiver if a physical layer of the receiver determines that the data is incorrectly received;
    transmitting, by the transmitter, buffered current RLC layer data to the receiver; and
    determining, by the physical layer of the receiver, whether the data is correctly received or not according to a check bit in the data after receiving the data from the transmitter.

2. The wireless data transmission method according to claim 1, before the step of transmitting, by the transmitter, the buffered current RLC layer data to the receiver, further comprising:

deciding, by the transmitter, whether the retransmission of the current RLC layer data has reached a predetermined maximum retransmission time or not;

dropping, by the transmitter, the buffered current RLC layer data or initiating a reset process if the retransmission of the current RLC layer data has reached the predetermined maximum retransmission time; and transmitting, by the transmitter, the buffered current RLC layer data to the receiver if the retransmission of the current RLC layer data has not reached the predetermined maximum retransmission time.

3. The wireless data transmission method according to claim 1, further comprising:

transmitting, by the physical layer of the receiver, the current RLC layer data to an RLC layer of the receiver through a medium access control (MAC) layer, and generating and feeding back a data-receiving packet indicating that the data is correctly received to the transmitter if the physical layer of the receiver determines that the current data is correctly received; and dropping, by the transmitter, the buffered current RLC layer data.

4. The wireless data transmission method according to claim 3, further comprising:

deciding, by the physical layer of the receiver, whether the current data is correctly received or not;

transmitting, by the physical layer of the receiver, the current RLC layer data to an RLC layer of the receiver through a medium access control (MAC) layer, and generating and feeding back a data-receiving packet indicating that the data is correctly received to the transmitter if the physical layer of the receiver determines that the current data is correctly received; and transmitting, by the transmitter, the buffered current RLC layer data to the receiver if the current data is incorrectly received.

5. The wireless data transmission method according to claim 3, wherein an RLC layer of the transmitter buffers the current RLC layer data;

the step of receiving, by the transmitter, a data-receiving packet indicating that the data is incorrectly received generated and fed back by the physical layer of the receiver if a physical layer of the receiver determines that the data is incorrectly received, and transmitting, by the transmitter, the buffered current RLC layer data to the receiver, comprises:

the physical layer of the receiver generates and feeds back a data-receiving packet indicating that the data is incorrectly received to the transmitter; then, a physical layer of the transmitter generates a data-receiving packet capable of being identified by the corresponding RLC layer according to the data-receiving packet, and transmits the generated data-receiving packet to the RLC layer through the MAC layer; and then, according to the data-receiving packet, the RLC layer of the transmitter transmits the buffered current RLC layer data to the receiver through the MAC layer and the physical layer of the transmitter; and the step of transmitting, by the physical layer of the receiver, the current RLC layer data to an RLC layer of the receiver through a medium access control (MAC) layer, and generating and feeding back a data-receiving packet indicating that the data is correctly received to the transmitter if the physical layer of the receiver determines that the current data is correctly received; and dropping, by the transmitter, the buffered current RLC layer data, comprises:

the physical layer of the receiver transmits the current RLC layer data to the RLC layer of the receiver through the MAC layer of the receiver, and generates and feeds back a data-receiving packet indicating that the data is correctly received to the transmitter; then, the physical layer of the transmitter generates a data-receiving packet capable of being identified by the corresponding RLC layer according to the data-receiving packet and transmits the generated data-receiving packet to the RLC layer of the transmitter through the MAC layer; and then, according to the received data-receiving packet, the RLC layer of the transmitter drops the buffered current RLC layer data.

6. The wireless data transmission method according to claim 3, wherein an MAC layer of the transmitter buffers the current RLC layer data;

the step of receiving, by the transmitter, a data-receiving packet indicating that the data is incorrectly received generated and fed back by the physical layer of the receiver if a physical layer of the receiver determines that the data is incorrectly received, and transmitting, by the transmitter, the buffered current RLC layer data to the receiver, comprises:

the physical layer of the receiver generates and feeds back a data-receiving packet indicating that the data is incorrectly received to a physical layer of the transmitter; then, the physical layer of the transmitter generates a data-receiving packet capable of being identified by the corresponding MAC layer according to the data-receiving packet, and transmits the generated data-receiving packet to the MAC layer of the transmitter; and then, according to the received data-receiving packet, the MAC layer of the transmitter transmits the current RLC layer data to the receiver through the physical layer of the transmitter; and the step of transmitting, by the physical layer of the receiver, the current RLC layer data to an RLC layer of the receiver through a medium access control (MAC) layer, and generating and feeding back a data-receiving packet indicating that the data is correctly received to the transmitter if the physical layer of the receiver determines that the current data is correctly received; and dropping, by the transmitter, the buffered current RLC layer data, comprises:

the physical layer of the receiver transmits the current RLC layer data to the RLC layer of the receiver through the MAC layer of the receiver, and generates and feeds back a data-receiving packet indicating that the data is correctly received to the physical layer of the transmitter; then, the physical layer of the transmitter generates a data-receiving packet capable of being identified by the corresponding MAC layer according to the data-receiving packet, and transmits the generated data-receiving packet to the MAC layer of the transmitter; and then, according to the received data-receiving packet, the MAC layer of the transmitter drops the buffered current RLC layer data.

7. The wireless data transmission method according to claim 5, wherein the transmitter is the UE, the RLC layer of the transmitter is an RLC layer of the UE, the MAC layer of the transmitter is an MAC layer of the UE, and the physical layer of the transmitter is a UE physical layer; the receiver is the UTRAN, the RLC layer of the receiver is an RLC layer of a radio network controller (RNC) (RNC-RLC), the MAC layer of the receiver is an MAC layer of the RNC, and the physical layer of the receiver is a node B (NB) physical layer; or the transmitter is the UTRAN, the RLC layer of the transmitter is an RLC layer of the RNC, the MAC layer of the transmitter is an MAC layer of the RNC, and the physical layer of the transmitter is a NB physical layer; the receiver is the UE the RLC layer of the receiver is an RLC layer of the UE, the MAC layer of the receiver is an MAC layer of the UE, and the physical layer of the receiver is a UE physical layer.

8. The wireless data transmission method according claim 6, wherein the transmitter is the UE, the RLC layer of the transmitter is an RLC layer of the UE, the MAC layer of the transmitter is an MAC layer of the UE, and the physical layer of the transmitter is a UE physical layer; the receiver is the UTRAN, the RLC layer of the receiver is an RLC layer of a radio network controller (RNC) (RNC-RLC), the MAC layer of the receiver is an MAC layer of the RNC, and the physical layer of the receiver is a node B (NB) physical layer; or the transmitter is the UTRAN, the RLC layer of the transmitter is an RLC layer of the RNC, the MAC layer of the transmitter is an MAC layer of the RNC, and the physical layer of the transmitter is a NB physical layer; the receiver is the UE the RLC layer of the receiver is an RLC layer of the UE, the MAC layer of the receiver is an MAC layer of the UE, and the physical layer of the receiver is a UE physical layer.

9. A transmitting system, comprising a data buffering module and a physical layer module, wherein the data buffering module is configured to buffer RLC layer data to be transmitted; and the physical layer module is configured to capture and process the RLC layer data in the data buffering module, then transmit the data to a receiver, and retransmit the RLC layer data according to a data-receiving packet received from the receiver for indicating that the RLC layer data is incorrectly received;

wherein the receiver determines whether the data is correctly received or not according to a check bit in the data after receiving the RLC layer data from the transmitter.

10. The transmitting system according to claim 9, wherein the physical layer module is further configured to drop the RLC layer data in the data buffering module according to a data-receiving packet received from the receiver for indicating that the RLC layer data is correctly received.

11. The transmitting system according to claim 9, further comprising: an MAC layer module including the data buffering module, configured to receive an RLC layer data packet, and then buffer the RLC layer data packet into the data buffering module; perform an MAC layer process on the RLC layer data packet, and then transmit data containing the RLC layer data packet to the physical layer module; re-read the corresponding buffered RLC layer data packet according to a data-receiving packet received from the physical layer module for indicating that the data is incorrectly received, and then transmit the RLC layer data packet to the physical layer module after performing the MAC layer process; and drop the corresponding RLC layer data packet in the data buffering module according to a data-receiving packet received from the physical layer module for indicating that the data is correctly received;

wherein the physical layer module receives data containing the RLC layer data packet from the MAC layer module and then transmits the data to the receiver, parses a data-receiving packet received from the receiver for indicating whether the data is correctly received or not, transmits a data-receiving packet, for indicating whether the data is correctly received or not to the MAC layer module correspondingly, re-receives the data containing the RLC layer data packet from the MAC layer module, and then transmits the data to the receiver.

12. The transmitting system according to claim 10, further comprising an RLC layer module including the data buffering module and an MAC layer module, wherein the RLC layer module is configured to process the RLC layer data in the data buffering module, transmit the RLC layer data packet to the MAC layer, re-process the buffered RLC layer data according to a data-receiving packet received from the MAC layer module for indicating the data is incorrectly received, then transmit the RLC layer data to the MAC layer module, and drop the RLC layer data in the data buffering module according to a data-receiving packet received from the MAC layer module for indicating that the data is correctly received;

the MAC layer module is configured to perform an MAC layer process on the received RLC data packet, transmit data containing the RLC layer data packet to the physical layer module, and then perform an MAC layer process on the data-receiving packet received from the physical layer module and forward the data-receiving packet to the RLC layer module; and the physical layer module receives the data containing the RLC layer data packet from the MAC layer module and transmits the data to the receiver, and transmits a data-receiving packet indicating whether the data is correctly received or not to the MAC layer module correspondingly according to the received data-receiving packet for indicating whether the data is correctly received or not, re-receives the data containing the RLC layer data packet from the MAC layer module, and transmits the data to the receiver.

13. The transmitting system according to claim 9, wherein the physical layer module, the MAC layer module, and the RLC layer module are respectively a UE physical layer module, a UE-MAC layer module, and a UE-RLC layer module; or the physical layer module is an NB physical layer module, and the MAC layer module and the RLC layer module are an RNC-MAC layer module and an RNC-RLC layer module.

14. A receiving system, comprising: a physical layer module, an MAC layer module, and an RLC layer module, wherein the physical layer module is configured to transmit/receive a correct RLC layer data to/from an RLC layer through an MAC layer, receive an RLC layer data from a transmitter, determine whether the RLC layer data is correctly transmitted or not, feed back to the transmitter a data-receiving packet indicating the data is incorrectly received according to a determination result that the RLC layer data is incorrectly received, receive buffered current RLC layer data from the transmitter, and determine whether the data is correctly received or not according to a check bit in the data after receiving the RLC layer data; and the RLC layer module is configured to receive the RLC layer data from the physical layer module through the MAC layer.

15. The receiving system according to claim 14, wherein the physical layer module is further configured to feed back a data-receiving packet indicating that the data is correctly received to the transmitter according to a determination result that the RLC layer data is correctly received.

16. The receiving system according to claim 14, wherein the physical layer module, the MAC layer module, and the RLC layer module are respectively a UE physical layer module, a UE-MAC layer module, and a UE-RLC layer module; or the physical layer module is an NB physical layer module, and the MAC layer module and the RLC layer module are an RNC-MAC layer module and an RNC-RLC layer module.

17. A wireless data receiving method, wherein a transmitter buffers current RLC layer data, the method comprising:
- receiving, by a receiver, the current RLC layer data from the transmitter;
- transmitting, by the receiver, a data-receiving packet indicating that the data is incorrectly received generated and fed back by the physical layer of the receiver if a physical layer of the receiver determines that the data is incorrectly received; and
- receiving, by the receiver, buffered current RLC layer data from the transmitter;
- determining, by the receiver, whether the data is correctly received or not according to a check bit in the data after receiving the data from the transmitter.

* * * * *